United States Patent [19]
Neufeld et al.

[11] Patent Number: 5,580,948
[45] Date of Patent: Dec. 3, 1996

[54] PREPARATION OF POLYARYLENE ETHER KETONES

[75] Inventors: Eckhard Neufeld, Limburgerhof; Bärbel Arnold-Mauer, Kallstadt; Jürgen Hofmann, Ludwigshafen; Thomas Heitz, Dannstadt-Schauernheim; Christoph Sachsenweger, Obrigheim; Petra Wieland, Worms, all of Germany

[73] Assignee: BASF Aktiengesellschaft, Ludwigshafen, Germany

[21] Appl. No.: 285,120

[22] Filed: Aug. 3, 1994

[30] Foreign Application Priority Data

Aug. 10, 1993 [DE] Germany .................. 43 26 774.2

[51] Int. Cl.$^6$ .................. C08G 8/02; C08G 14/00
[52] U.S. Cl. .................. 528/125; 528/126; 528/128; 528/219; 526/65; 526/66
[58] Field of Search .................. 528/125, 126, 528/128, 219; 526/65, 66

[56] References Cited

U.S. PATENT DOCUMENTS 3,791,890 2/1974 Gander et al. .................. 260/61
5,081,215 1/1992 Koch et al. .................. 528/125

FOREIGN PATENT DOCUMENTS 314384 5/1989 European Pat. Off. .

*Primary Examiner*—James J. Seidleck
*Assistant Examiner*—Duc Truong
*Attorney, Agent, or Firm*—Keil & Weinkauf

[57] ABSTRACT

For the preparation of polyarylene ether ketones by Friedel-Crafts polycondensation, a reaction mixture consisting of
A. a monomer system,
B. a Lewis acid,
C. if required, a Lewis base and
D. an inert solvent
is subjected to polycondensation in two reaction zones, discharged from the second reaction zone with plug flow and compounded. The reaction mixture is subjected to polycondensation in the first reaction zone while stirring to a viscosity of about 2,000 mPa.s, is transferred to the second reaction zone and is discharged therefrom by means of an inert solvent or of an inert gas saturated with the solvent, under from about 6 to 65, preferably from 10 to 25, bar, the transport pressure being reduced in at least two stages and the pressure reduction in the first stage being not more than 60%.

6 Claims, 1 Drawing Sheet

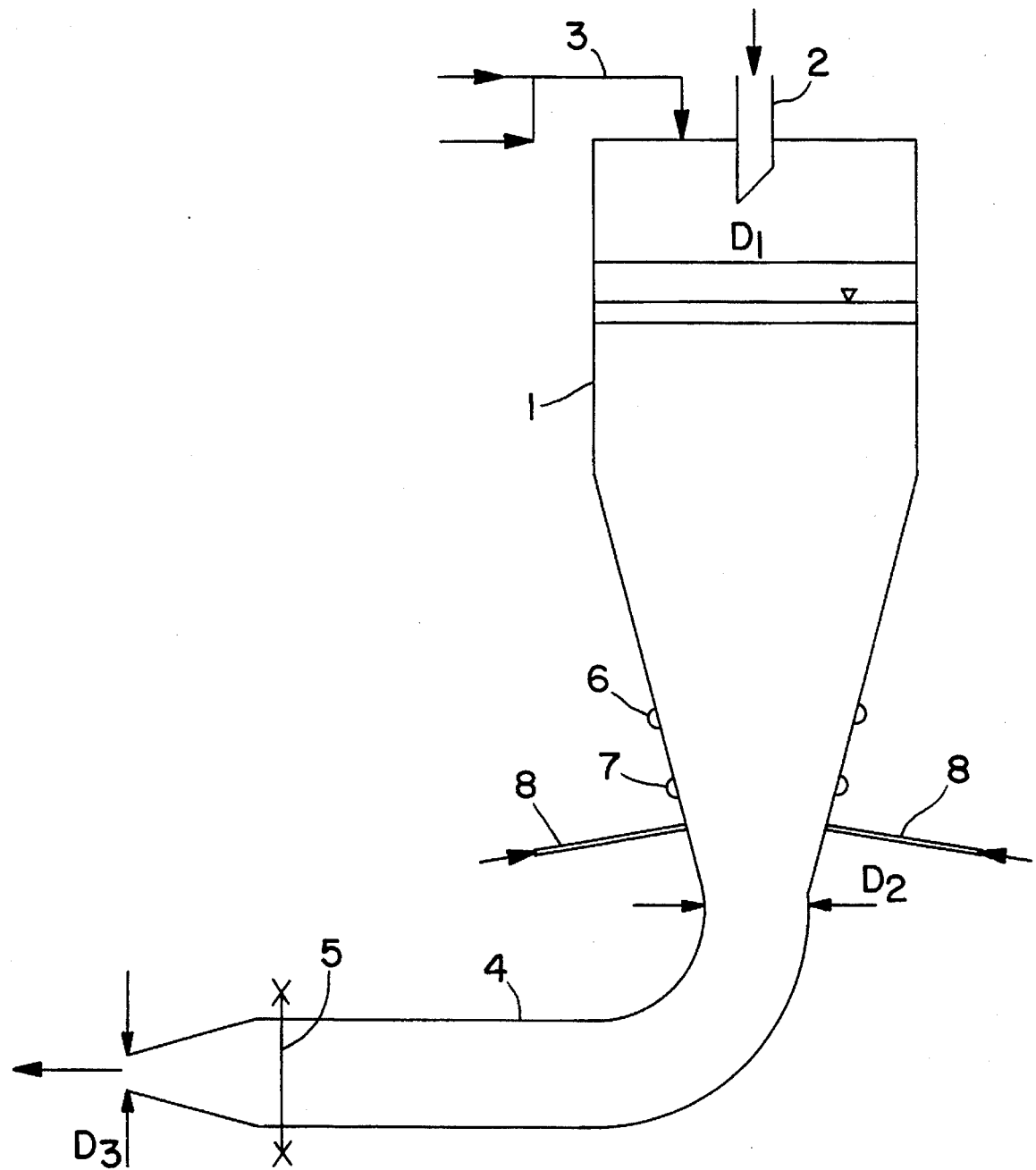

PREPARATION OF POLYARYLENE ETHER KETONES

For the preparation of the generic compounds of the invention, the preamble of claim 1 starts from a known process based on DE-A-38 29 520, in which polyarylene ether ketones are prepared by electrophilic polycondensation by reacting A. a monomer system comprising
   (a) an aromatic dicarboxylic acid chloride or phosgene and an essentially equimolar amount of a polynuclear aromatic which contains two hydrogen atoms replaceable by electrophilic substitution or
   (b) a polynuclear aromatic carboxylic acid chloride which has one hydrogen atom replaceable by electrophilic substitution and is capable of autocondensation and
   (c) if required, a monofunctional reagent for blocking the terminal groups,
B. a Lewis acid in an amount of at least one mol per nucleophilic group in the reaction mixture and in addition a small excess which is sufficient to catalyze the reaction,
C. if required, a Lewis base in an amount of from 0.01 to 4 mol per mol of acid groups and
D. a solvent which is inert under the reaction conditions in the presence of a Friedel-Crafts catalyst. The polycondensation is carried out in two reaction zones, mixing of the liquid and solid reaction components and prepolymerization being effected in the first reaction zone in a stirred kettle. The reaction mixture is transported by means of gas pressure into and, with plug flow, through the second reaction zone, allowed to undergo complete polycondensation, discharged continuously via a screw unit and compounded. The problem here, however, is ensuring uniform product discharge from the second reaction zone. Transport by means of gas pressure may result in a reduction in the amount of solvent in the polymer surface at the interface with the gas phase, ie. the polymer surface dries out. This leads to excessive adhesion of the surface layer to the wall, and the surface forms a vortex, which is very undesirable since it causes deposits of the products. Obstacles to flow in the lower region of the reaction zone and corresponding linings of the reaction zone make it possible to avoid this phenomenon only to a limited extent. The transport of the polycondensate out of the second reaction zone is also unsatisfactory. The screw unit provided for this purpose, whose product-conveying parts must be provided with an antiadhesion coating since otherwise the reaction mixture cannot be transported, has proved to be very susceptible to faults. The approach of the screw unit in the case of a filled screw is particularly problematic owing to the high energy dissipation, which may lead to thermal damage to the product in the case of nondecomplexed polyarylene ether ketone.

It is an object of the present invention to provide a process for the preparation of polyarylene ether ketones which is free of the deficiencies described and in particular permits transport of the reaction mixture without a mechanical discharge aid.

We have found that this object is achieved by the measures according to the defining clause of claim 1.

Suitable components for the novel process for the preparation of polyarylene ether ketones are those described in DE-A-38 29 520. The polycondensation, too, is carried out in the manner described there.

A. Preferred monomer systems A are:
   a1) terephthaloyl chloride and 4,4'-diphenoxybenzophenone, which leads to a polyarylene ether ketone having the structure

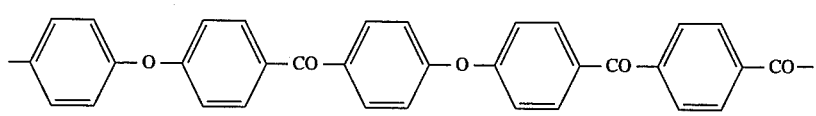

a2) terephthaloyl chloride and 4,4'-diphenoxybenzene, which leads to

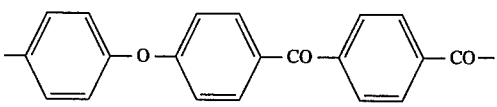

a3) terephthaloyl chloride and 1,4-bis(phenoxybenzoyl)benzene, which leads to

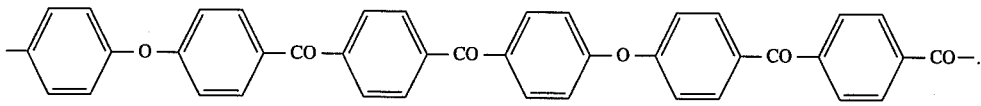

The aromatic dicarboxylic acid chloride and the polynuclear aromatic are used in essentially equimolar amounts, small deviations being possible in order to regulate the molecular weight.

b) The autopolycondensation of p-phenoxybenzoyl chloride leads to

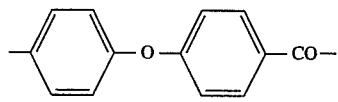

c) Monofunctional reagents for chain termination are, for example, benzoyl chloride and phenoxybenzophenone.

They are particularly important in the polycondensation of the monomers b) for regulation of the molecular weight; they are also used for stabilizing the polymers in the melt. They are employed in general in amounts of from 1 to 10%, based on the monomers a) or b).

B) A preferred Lewis acid is aluminum chloride, but aluminum bromide, antimony pentachloride, boron trifluoride, zinc chloride, iron(III) chloride, titanium tetrachloride and tin(II) chloride are also suitable. They are used in an amount of at least one mol per nucleophilic group in the reaction mixture, it being necessary to use a small excess which is sufficient to catalyze the polycondensation reaction.

C) The reaction mixture preferably contains a Lewis base, for example an alkali metal halide, such as LiCl or NaCl, as well as polar organic compounds, such as N-methylpyrrolidone, N,N-dimethylformamide, 1-methyl-2-pyrrolidone, dimethyl sulfone, diphenyl sulfone, tetramethylene sulfone (sulfolane), dimethyl sulfide, imidazole, benzophenone and trimethylamine. LiCl and dimethyl sulfone are preferred. They are used in amounts of from 0.01 to 4 mol per mol of acid groups.

D) Suitable inert solvents are methylene chloride, o-dichlorobenzene, 1,2,4-trichlorobenzene, 1,2-dichloroethane and 1,1,2,2-tetrachloroethane.

The polycondensation is usually carried out at from −70° to +150° C. Advantageously, it is started in the first reaction zone at low temperatures, for example from −50° to −10° C., and the temperature is then allowed to increase to, for example, −30° to +30° C. The total reaction should be carried out at least under superatmospheric pressure, advantageously above 1.1, in particular from 2 to 10, bar, in order to prevent escape of the hydrogen chloride formed and hence foaming. This should also be borne in mind in the passage from the first to the second reaction zone. To transfer the prepolymer from the stirred preliminary reactor to the subsequent reactor, it is advantageous to set a higher pressure in the preliminary reactor than in the subsequent reactor. It may be useful slightly to reduce the pressure in the subsequent reactor during introduction of prepolymer into said reactor. However, the pressure should not be reduced to such an extent that the reaction material foams.

Mixing of the liquid and solid reaction components and prepolymerization are carried out in the first reaction zone while stirring, advantageously in a cooled stirred kettle which advantageously consists of a corrosion-resistant alloy, eg. Hastelloy. The initial value of the viscosity is about 0.5 mPa.s. Polycondensation is carried out in the first reaction zone until the viscosity has increased to 20–2,000, preferably 50–200, mPa.s. In the case of the polycondensation of terephthaloyl chloride with diphenoxybenzophenone, this takes from about 15 to 25 minutes from the addition of the final monomer.

The prepolymer is then introduced directly into the second reaction zone. This is effected by gravitational force or pressure from an inert gas. The viscosity during transfer of the prepolymer to the subsequent reactor should be sufficiently high to prevent the aluminum chloride from settling out in the subsequent reactor, since otherwise a high molecular weight polyether ketone is not formed. However, it should still be sufficiently low to permit complete transfer of the prepolymer to the subsequent reactor.

The second reaction zone consists of a tube reactor which can be fed via one or more stirred kettles. A tube reactor suitable for the novel process is shown schematically in the drawing. It comprises essentially a vertical tube element (1) which has a cylindrical cross-section and whose inner lateral surface is coated or lined with an antiadhesive material inert to the reaction mixture, for example with polytetrafluoroethylene. The tube element has a height/diameter ratio of from 6 to 15. Feeds (2) and (3) for the reaction mixture and for a solvent and an inert gas or inert gas/solvent mixture for forcing out the reaction mixture are provided at the top of the tube element. The lower end of the tube element is conically tapered, angles of inclination of <45°, preferably from 5° to 28° C. having proven useful. The diameter $D_2$ is dependent on the mass flow of the reaction mixture and is in general more than 50 mm. An advantageously right angled outflow pipe (4) which is likewise tapered at its free end and has a shutoff element (5) directly before the taper is connected to the cone. (6, 7) denote means for radioactive level measurement and (8) denotes connections for feeding a further inert gas stream which is generally saturated with an inert solvent.

The reaction mixture introduced into the tube reactor condenses therein completely during a residence time of from about 4 to about 6 hours. Furthermore, an inert solvent or an inert gas, in particular nitrogen, which is saturated with the inert solvent, is passed into the second reaction zone, and the now gel-like polyarylene ether ketone is discharged from the second reaction zone with plug flow under the action of the solvent and/or of the inert gas. The solvent or inert gas pressure is from about 6 to 65, preferably from 10 to 25, bar. During the discharge of the polyarylene ether ketone, the transport pressure is reduced in at least two stages, the pressure reduction in the first stage, ie. up to the transition from the cone to the outflow pipe, being not more than 60%, preferably up to 20%. In the simplest case, it is sufficient for this purpose appropriately to establish the ratio of the diameters $D_1$ and $D_2$ and, for the further pressure stage, the diameter $D_3$. In general, a ratio of diameters $D_1:D_2$ of from 2:1 to 20:1 has proven particularly advantageous. The polyarylene ether ketone is subsequently compounded in a working up unit, for example in a mill.

By transporting the polyarylene ether ketone with the aid of an inert solvent or of a solvent-saturated inert gas, it is possible completely to avoid vortex formation and the second reaction zone is free of product residue which would have to be removed by an expensive procedure or would lead to impurities in subsequent product batches. The uniform product quality, in particular with regard to the degree of polymerization, is especially noteworthy.

In a particularly advantageous embodiment of the novel process, the inert solvent passed into the second reaction zone is metered in an amount such that the surface of the reaction mixture is completely covered with solvent, and the reaction mixture is discharged by means of an inert gas under a gas pressure from about 6 to 65, preferably from 10 to 25, bar. This makes it possible to reduce the apparatus required for carrying out the process and for corresponding safety measures.

According to a further feature of the invention, an inert gas is passed countercurrent into the reaction mixture in the second reaction zone. This feed of inert gas is effected immediately after the transfer of the reaction mixture from the first reaction zone and results in an additional mixing effect, so that the precondensate can be transferred earlier and with a substantially lower viscosity, for example about 100 mPa.s, from the first to the second reaction zone, and a considerable reduction in the excess catalyst. In general, the inert gas is saturated with the inert solvent used in the reaction of the components in the first reaction zone. For this purpose, the inert gas is passed through a solvent bath at a corresponding pressure and at a temperature which is at least close to the temperature of the reaction mixture in the second reaction zone. The inert gas absorbs solvent in an amount corresponding to its saturation vapor pressure.

The Example which follows illustrates the process:
In a 20 l pressure-resistant vessel, 3,283 g (24.62 mol) of aluminum chloride were suspended in 5,212 ml of methylene chloride and cooled to below 0° C. 635.37 g (6.75 mol) of dimethyl sulfone, 913.61 g (4.5 mol) of terephthaloyl chloride and 25.30 g (0.18 mol) of benzyl chloride were added in succession while cooling. The mixture is cooled to <−10° C. after which 1,681.85 g (4.59 mol) of 4,4-diphenoxybenzophenone were also metered in. The vessel was closed so that it was gas-tight, and nitrogen under about 10 bar was forced in to maintain the pressure. With slow heating, the viscosity of the reaction mixture increased to about 2,000 mPa.s in the course of about 15 to 20 minutes. The temperature was then about 20° C. and the volume of the precondensate was about 9,000 ml. By means of the applied nitrogen pressure, the reaction mixture could be discharged in the course of 2 minutes through the bottom outlet valve and transferred to a pressure-resistant subsequent reactor coated on the inside with PTFE.

The diameter $D_1$ of the subsequent reactor was 130 mm, the length of the cylindrical part was 800 mm and the angle of the cone was 10°. The outflow of the subsequent reactor had a diameter $D_2$ of 50 mm. Before the mill, the outflow pipe, which had a length of about 500 mm, was reduced to a diameter $D_3$ of 20 mm with an angle of taper of 10°. All product-conveying surfaces of the subsequent reactor were coated with PTFE.

60 minutes after transfer of the reaction mixture to the subsequent reactor, 300 ml of methylene chloride were added to the reaction mixture. The subsequent reactor was operated in such a way that, after a residence time of 5 hours, the total reaction mixture was discharged in the course of 45 minutes with the aid of an inert gas stream at 10 bar via a mill. The temperature in the subsequent reactor was 25° C. and the pressure after the first pressure stage was about 9 bar. The discharged reaction material was worked up using a hammer mill, 200 l/h of water being sprayed in to hydrolyze the polymer/aluminum chloride complex. At a throughput of about 3.0 kg of polymer per hour, the power consumption of the mill was 1.0 kW.

The polymer was then freed from catalyst residues by repeated extraction with water and was dried under atmospheric pressure at 290° C.

The polymer obtained had an intrinsic viscosity of 1.07 (measured in concentrated sulfuric acid, 0.5/100 ml). Its melting point was 375° C.

We claim:

1. A process for the preparation of a polyarylene ether ketone by Friedel-Crafts polycondensation, in which a reaction mixture consisting of A. a monomer system comprising (a) an aromatic dicarboxylic acid chloride or phosgene and an essentially equimolar amount of a polynuclear aromatic which contains two hydrogen atoms replaceable by electrophilic substitution or (b) a polynuclear aromatic carboxylic acid chloride which has one hydrogen atom replaceable by electrophilic substitution and is capable of autocondensation and (c) optionally, a monofunctional reagent for blocking the terminal groups, B. a Lewis acid in an amount of at least one mol per nucleophilic group in the reaction mixture and in addition a small excess which is sufficient to catalyze the reaction, C. optionally, a Lewis base in an amount of from 0.01 to 4 mol per mol of acid groups and D. a solvent which is inert under the reaction conditions is subjected to polycondensation in a first reaction zone while stirring to a viscosity of about 2,000 mPa.s, is transported into and through a second vertical reaction zone, allowed to undergo complete polycondensation and discharged from said reaction zone with plug flow, wherein, after transfer of the reaction mixture to the second reaction zone, an inert solvent or an inert gas saturated with the inert solvent is passed into said reaction zone and the reaction mixture is discharged by means of the solvent or inert gas under from about 6 to 65 bar, the transport pressure being reduced in at least two stages and the pressure reduction in the first stage being not more than 60%.

2. A process as defined in claim 1, wherein the inert solvent passed into the second reaction zone is metered in an amount such that the surface of the reaction mixture is completely covered with solvent, and the reaction mixture is discharged by means of an inert gas under a gas pressure of from about 6 to 65 bar.

3. A process as defined in claim 1, wherein the reaction mixture is transported through the second reaction zone under from 10 to 25 bar.

4. A process as defined in claim 1, wherein an inert gas is passed countercurrent into the reaction mixture in the second reaction zone.

5. A process as defined in claim 4, wherein the inert gas is saturated with the inert solvent stated in claim 1 under D.

6. A process as defined in claim 2, wherein the reaction mixture is transported through the second reaction zone under from 10 to 25 bar.

* * * * *